United States Patent
Garthwaite

(10) Patent No.: US 7,321,909 B1
(45) Date of Patent: Jan. 22, 2008

(54) METHOD AND APPARATUS FOR FORWARDING REFERENCES TO OBJECTS CONCURRENTLY WITH SPACE-INCREMENTAL GARBAGE COLLECTION

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 452 days.

(21) Appl. No.: 11/021,287

(22) Filed: Dec. 23, 2004

(51) Int. Cl.
*G06F 17/30* (2006.01)

(52) U.S. Cl. .................................... 707/206
(58) Field of Classification Search ............... 707/2, 707/10, 102, 206, 1; 711/114; 709/213
See application file for complete search history.

(56) References Cited

U.S. PATENT DOCUMENTS

| | | |
|---|---|---|
| 4,724,521 A | 2/1988 | Carron et al. |
| 4,797,810 A | 1/1989 | McEntee et al. |
| 4,912,629 A | 3/1990 | Shuler, Jr. |
| 4,989,134 A | 1/1991 | Shaw |
| 5,088,036 A | 2/1992 | Ellis et al. |
| 5,333,318 A | 7/1994 | Wolf |
| 5,392,432 A | 2/1995 | Engelstad et al. |
| 5,485,613 A | 1/1996 | Engelstad et al. |
| 5,560,003 A | 9/1996 | Nilson et al. |
| 5,687,370 A | 11/1997 | Garst et al. |
| 5,801,943 A | 9/1998 | Nasburg |
| 5,845,278 A | 12/1998 | Kirsch et al. |
| 5,845,298 A | 12/1998 | O'Connor et al. |
| 5,857,210 A | 1/1999 | Tremblay et al. |
| 5,873,104 A | 2/1999 | Tremblay et al. |
| 5,873,105 A | 2/1999 | Tremblay et al. |
| 5,900,001 A | 5/1999 | Wolczko et al. |
| 5,903,900 A | 5/1999 | Knippel et al. |
| 5,930,807 A | 7/1999 | Ebrahim et al. |
| 5,953,736 A | 9/1999 | O'Connor et al |
| 5,960,087 A | 9/1999 | Tribble et al. |
| 5,999,974 A | 12/1999 | Ratcliff et al. |
| 6,021,415 A | 2/2000 | Cannon et al. |
| 6,047,125 A | 4/2000 | Agesen et al. |

(Continued)

FOREIGN PATENT DOCUMENTS

EP 0 904 055 A1 9/1999

(Continued)

OTHER PUBLICATIONS

U.S. Appl. No. 10/287,851, filed Nov. 5, 2002, Garthwaite, et al.

(Continued)

*Primary Examiner*—Etienne Leroux
(74) *Attorney, Agent, or Firm*—Osha Liang LLP

(57) ABSTRACT

In order to prevent concurrent garbage collection using a space-incremental algorithm from corrupting objects, objects are evacuated by copying them to relocated destinations and a forwarding data structure is associated with each region created by the space-incremental algorithm. The forwarding data structure is used to map object locations in that region to their relocated destinations. When an attempt is made to access the object, the forwarding data structure is accessed and, if the object is found in the data structure, the corresponding forwarding address is used to access the object. The forwarding data structure can be a hash table, a direct mapped table or other structure.

28 Claims, 6 Drawing Sheets

U.S. PATENT DOCUMENTS

| | | | |
|---|---|---|---|
| 6,049,390 | A | 4/2000 | Notredame et al. |
| 6,049,810 | A | 4/2000 | Schwartz et al. |
| 6,065,020 | A | 5/2000 | Dussud |
| 6,098,089 | A | 8/2000 | O'Connor et al. |
| 6,148,309 | A | 11/2000 | Azagury et al. |
| 6,148,310 | A | 11/2000 | Azagury et al. |
| 6,173,294 | B1 | 1/2001 | Azagury et al. |
| 6,185,581 | B1* | 2/2001 | Garthwaite ............... 707/206 |
| 6,226,653 | B1 | 5/2001 | Alpern et al. |
| 6,243,720 | B1 | 6/2001 | Munter et al. |
| 6,260,120 | B1 | 7/2001 | Blumenau et al. |
| 6,289,358 | B1 | 9/2001 | Mattis et al. |
| 6,314,436 | B1 | 11/2001 | Houldsworth |
| 6,321,240 | B1 | 11/2001 | Chilimbi et al. |
| 6,353,838 | B2 | 3/2002 | Sauntry et al. |
| 6,381,738 | B1 | 4/2002 | Choi et al. |
| 6,393,439 | B1 | 5/2002 | Houldsworth et al. |
| 6,415,302 | B1 | 7/2002 | Garthwaite et al. |
| 6,424,977 | B1 | 7/2002 | Garthwaite |
| 6,434,576 | B1 | 8/2002 | Garthwaite |
| 6,434,577 | B1 | 8/2002 | Garthwaite |
| 6,442,661 | B1 | 8/2002 | Dreszer |
| 6,449,626 | B1 | 9/2002 | Garthwaite et al. |
| 6,496,871 | B1 | 12/2002 | Jagannathan et al. |
| 6,529,919 | B1 | 3/2003 | Agesen et al. |
| 6,567,905 | B2 | 5/2003 | Otis |
| 6,640,278 | B1 | 10/2003 | Nolan et al. |
| 6,757,890 | B1 | 6/2004 | Wallman |
| 6,769,004 | B2 | 7/2004 | Barrett |
| 6,820,101 | B2 | 11/2004 | Wallman |
| 6,826,583 | B1 | 11/2004 | Flood et al. |
| 6,868,488 | B2 | 3/2005 | Garthwaite |
| 6,892,212 | B2 | 5/2005 | Shuf et al. |
| 6,928,460 | B2 | 8/2005 | Nagarajan et al. |
| 6,931,423 | B2 | 8/2005 | Sexton et al. |
| 2002/0032719 | A1 | 3/2002 | Thomas et al. |
| 2002/0095453 | A1 | 7/2002 | Steensgaard |
| 2002/0133533 | A1 | 9/2002 | Czajkowski et al. |
| 2002/0138506 | A1 | 9/2002 | Shuf et al. |
| 2003/0088658 | A1 | 5/2003 | Davies et al. |
| 2003/0200392 | A1 | 10/2003 | Wright et al. |
| 2003/0217027 | A1 | 11/2003 | Farber et al. |
| 2003/0221063 | A1* | 11/2003 | Eguchi et al. .............. 711/114 |
| 2004/0010586 | A1 | 1/2004 | Burton et al. |
| 2004/0039759 | A1 | 2/2004 | Detlefs et al. |
| 2004/0215914 | A1 | 10/2004 | Dussud |

FOREIGN PATENT DOCUMENTS

| | | |
|---|---|---|
| EP | 0 969 377 A1 | 1/2000 |
| WO | WO0188713 A2 | 11/2001 |

OTHER PUBLICATIONS

Appel, "Simple Generational Garbage Collection and Fast Allocation", Software Practice and Experience, 19(2), 1989, 171-183.

Appel, et al., "Real-Time Concurrent Collection on Stock Multiprocessors", ACM SIGPLAN Notices, 1988.

Appleby, Karen, "Garbage Collection for Prolog Based on WAM, vol. 31, Issue 6", Communication of the ACM, Jun. 1, 1998, 719-741.

Arora, et al., "Thread Scheduling for Multiprogrammed Multiprocessors", Proceedings of the 10th Annual ACM Symposium on Parallel Algorithms and Architecture, Jun. 1998.

Bacon, et al., "Java without the Coffee Breaks: A nonintrusive Multiprocessor Garbage Collector", SIGPLAN Conference on Programming Language Design and Implementation, Jun. 2001, Snowbird, UT.

Baker, "List Processing in Real Time on a Serial Computer", Communications of the ACM 21, Apr. 1978, 280-294.

Barrett, et al., "Using Lifetime Predictors to Improve Memory Allocation Performance", SIGPLAN'93 Conference on Programming Languages Design and Implementation vol. 28(6) of Notices, Jun. 1993, 187-196, ACM Press, Albuquerque, NM.

Blackburn & McKinley, "In or Out? Putting Write Barriers in Their Place", Jun. 20, 2002, Berlin.

Brooks, "Trading Data Space for Reduced Time and Code Space in Real-Time Garbage Collection on Stock Hardware", Proceedings of the 1984 Acm Symposium on Lisp and Funcional Programming, Aug. 1984, 108-113, Austin, TX.

Chilimbi, et al., "Using Generational Garbage Collection to Implement Cache-Conscious Data Placement", International Symposium on Memory Management, Oct. 1998.

Clark, "An Efficient List-Moving Algorithm Using Constant Workspace, vol. 19 No. 6", Communications of the ACM, Jun. 1976, 352-354.

Clark, et al., "Compacting Garbage Collection can be Fast and Simple", Software-Practice and Experience, vol. 26, No. 2, Feb. 1996, 177-194.

Courts, "Improving Locality of Reference in a Garbage-Collecting Memory Management System", Communications of the ACM, vol. 31, No. 9, Sep. 1988, 1128-1138.

Flood, et al., "Parallel Garbage Collection for Shared Memory Multiprocessors", USENIX JVM Conference, Apr. 2001.

Goldstein, et al., "Lazy Threads: Implementing a Fast Parallel Call, vol. 37, No. 1", Journal of Parallel and Distributed Computing, Aug. 1996, 5-20.

Grarup, et al., "Incremental Mature Garbage Collection", M.Sc. Thesis @ http://www.daimi.aau.dk/jacobse/Papers, Aug. 1993.

Hanson, "Fast Allocation and Deallocation of Memory Based on Object Lifetimes", Software Practice and Experience, Jan. 1990, 20(1):5-12.

Harris, "Dynamic Adaptive Pre-Tenuring", In Proceedings of the Int'l Symposium on Memory Management, Oct. 2000, 127-136.

Herlihy, et al., "Lock-Free Garbage Collection for Multiprocessors", ACM SPAA, 1991, 229-236.

Holzle, Urs, "A Fast Write Barrier for Generational Garbage Collectors", Workshop on Garbage Collection in Object Oriented Systems, Oct. 1993.

Hosking, et al., "Remembered Sets Can Also Play Cards", OOPSLA/ECOOP Workshop on Garbage Collection in Object-Oriented Systems, Oct. 1993.

Hosking, et al., "Protection Traps and Alternatives for Memory Management of an Object-Oriented Language", Object Systems Laboratory, Dec. 1993, 1-14, Dept. of Comp. Sci., Amherst, MA.

Hudson, et al., "Adaptive Garbage Collection for Modula-3 and Small Talk", OOPSLA.ECOOP '90 Workshop on Garbage Collection in Object-Oriented Systems, Oct. 27, 1990.

Hudson, et al., "A Language—Independent Garbage Collector Toolkit", Coins Technical Report, Sep. 1991.

Hudson, et al., "Training Distributed Garbage: The DMOS Collector", University of St. Andrews Tech Report, 1997, 1-26.

Hudson, et al., "Garbage Collecting the World: One Car at a Time", ACM SIGPLAN Notices 32, 1997, 162-175.

Hudson, et al., "Sapphire: Copying GC Without Stopping the World", Practice and Experience Special Issue, Date Unknown, JAVA/Grande/Iscope.

Jones and Lins, "Garbage Collection: Algorithms for Automatic Dynamic Memory Management", 1996, 165-179, John Wiley and Sons, NY.

Lieberman, et al., "A Real-Time Garbage Collector Based on the Lifetimes of Objects", Communications of the ACM, 1983, 26(6).

Liskov, et al., "Partitioned Garbage Collection of a Large Stable Heap", Proceedings of IWOOOS, 1996, 117-121.

Moon, "Garbage Collection in a Large Lisp System", Conference Record of the 1984 ACM Symposium on LISP and Functional Programming, Aug. 1984, 235-246, Austin, TX.

Moss, et al., "A Complete and Coarse-Grained Incremental Garbage Collection for Persisten Object Strores", Proceedings 7th Int'l Workshop on Persisten Object System, 1996, 1-13, Cape May, NJ.

Munro, et al., "Incremental Garbage Collection of a Persistent Object Store using PMOS", 3rd Int'l Workshop on Persistence and Java, 1998, 78-91, Tiburon, California.

Nettles, Scott, "Real-Time Replication Garbage Collection", Avionics Lab, Wright Research and Development Center, 1993, PDDI.

Padopoulos, "Hood: A User-Level Thread Library for Multiprogramming Multiprocessors, Thesis: The Uni. of TX", University of Texas, Aug. 1998, 1-71, Austin.

Roy, et al., "Garbage Collection in Object-Oriented Databases Using Transactional Cyclic Reference Counting", VLDB Journal—The International Journal on Very Large Da Bases, vol. 7, Issue 3, 1998, 179-193.

Seligmann, et al., "Incremental Mature Garbage Collection, In the European Conference on Object-Oriented Programming", M.Sc. Thesis @http://www.daimi.aau.dk/jacobse/Papers/, 1995.

Shuf, et al., "Exploiting Profilic Types for Memory Management and Optimizations. ACM ISBN Sep. 2, 2001", POPL, Jan. 2002, Portland.

Stamos, "Static Grouping of Small Objects to Enhance Performance of a Paged Virtual Memory", ACM Transactions on Computer Systems, vol. 2, No. 2, May 1984, 155-180.

Ungar, "Generation Scavenging: A Non-Disruptive High Performance Storage Reclaration Algorithm", ACM SIGPLAN Notices, Apr. 1984, 19(5).

Ungar, et al., "Tenuring Policies for Generation-Based Storage Reclamation", ACM SIGPLAN Notices, 1988, 23(11)1-17.

Venners, "Garbage Collection, Inside the Java 2 Virtual Machine; Chapter 9", www.artima.com, Date Unknown, parts 1-18.

Wilson, "Uniprocessor Garbage Collection Techniques", Proceedings of Int'l Workshop on Memory Management, 1992, V. 637.

Wilson, "Uniprocessor Garbage Collection Techniques", Technical Report, University of Texas, 1994.

Withington, P.T., "How Real is "Real-Time" GC?", Symbolics, Inc., Oct. 6, 1991, Burlington, MA.

Zee, et al., "Write Barrier Removal by Static Analysis", OOPSLA '02, Nov. 2002.

Zorn, "Segregating Heap Objects by Reference Behavior and Lifetime", In 8th Int'l Conferenceon Architectural Support for Programming Languages and Operating Systems, Oct. 1998, 12-32, San Jose, CA.

Zorn, Benjamin, "Barrier Methods for Garbage Collection", Dept. of Computer Science, Uni. of Colorado, Nov. 1990, 1-37, Boulder.

Azagury, et al., "Combining Card Marking With Remembered Sets: How to Save Scanning Time", ACM SIGPLAN Notices, Oct. 1998, V. 34(3), ACM Press, Vancouver, Canada.

Cheney, "A Nonrecursive List Compacting Algorithm, vol. 13, No. 11", Communications of the ACM, Nov. 1970, 677-678, Uni. Math. Lab., Cambridge, European Patent Office.

Cheng, et al., "Generational Stack Collection and Profile-Driven Pretenuring", SIGPLAN'98 Conference on Programming Languages Design and Implementation, Jun. 1998, 162-173, ACM PRESS, Montreal, Canada.

Hosking, et al., "A Comparative Performance Evaluation of Write Barrier Implementations", OOPSLA; ACM Conference on Object-Oriented Systems, Languages and Applications, Oct. 1992, V. 27(10), ACM Press, Vancouver, Canada.

Lam, et al., "Object Type Directed Garbage Collection to Improve Locality", Proceedings of the International Workshop on Memory Management, Sep. 1992, 404-425, St. Malo, France.

Lam, et al., "Effective Static-Graph Reorganization to Improve Locality in Garbage Collected Systems", Proceedings of ACM SIGPLAN Conference on Programming Language Design and Implementation, Jun. 1991, Toronto, Canada.

Pirinen, Pekka, "Barrier Techniques for Incremental Tracing", Harlequin Limited, Date Unknown, 20-25, Cambridge, Great Britain.

Wilson, et al., "Effective Static-Graph Reorganization to Improve Locality in Garbage Collected Systems", Proceedings of ACM SIGPLAN Conference on Programming Language Design and Implementation, Jun. 1991, Canada.

Jones and Lins, "Garbage Collection: Algorithms for Automatic Dynamic Memory Management", 1996, pp. 28-33, 121 and 214-215, John Wiley and Sons, NY.

Printezis, et al., "Visualising the Train Garbage Collector", ISMM '02, 2002, pp. 50-63, Berlin, Germany.

* cited by examiner

METHOD AND APPARATUS FOR FORWARDING REFERENCES TO OBJECTS CONCURRENTLY WITH SPACE-INCREMENTAL GARBAGE COLLECTION

BACKGROUND

This invention relates to the reclamation of unused memory space, or "garbage collection", using space-incremental collection techniques. Memory reclamation may be carried out by a special purpose garbage collection algorithm that locates and reclaims memory which is unused, but has not been explicitly de-allocated. There are many known garbage collection algorithms, including reference counting, mark-sweep, mark-compaction and generational garbage collection algorithms. These, and other garbage collection techniques, are described in detail in a book entitled "Garbage Collection, Algorithms For Automatic Dynamic Memory Management" by Richard Jones and Raphael Lins, John Wiley & Sons, 1996.

However, many of the aforementioned garbage collection techniques often lead to long and unpredictable delays because normal processing must be suspended during the garbage collection process. Therefore, they are generally not suitable in situations, such as real-time or interactive systems, where non-disruptive behavior is of greatest importance. Conventional generational collection techniques alleviate these delays somewhat by concentrating collection efforts on small memory areas, called "young" generations in which most of the activity occurs. This concentration reduces the need for collecting the remaining large memory area, called the "old" or "mature" generation and, thus, reduces the time consumed during garbage collection.

When the mature generation is eventually collected, many generational techniques lead to pauses in normal operation which, while less frequent, are still highly disruptive. One approach to eliminate these long pauses is to apply a space-incremental technique to the regions containing older objects. Space-incremental collection techniques allow a subset of objects in the heap to be collected and evacuated independently of the rest of the heap. A given subset consists of one or more possibly noncontiguous regions and forms the collection-set. Examples of such techniques include the Train algorithm as described in "*Incremental Collection of Mature Objects*", R. L. Hudson, J. E. B. Moss, *Proceedings of the International Workshop on Memory Management*, volume 637 of *Lecture Notes in Computer Science, St. Malo, France*, pp 388-403, 1992, Springer-Verlag, London, Great Britain; the Garbage-first algorithm as described in "Garbage-First Garbage Collection", D. Detlefs, C. Flood, S. Heller, A. Printezis, *Proceedings of the 4th International Symposium on Memory Management*, pp 37-48, 2004 and other techniques allowing partial compaction of the heap as described in "An Algorithm for Parallel Incremental Compaction", O. Ben-Yitzhak, I. Goft, E. K. Kolodner, K. Kuiper, V. Leikehman, *Proceedings of the 3rd International Symposium on Memory Management*, pp 100-105, 2002.

As an example, the Train algorithm divides the generation's memory into a number of fixed-sized regions, or car sections. The algorithm associates a car structure with each car section to manage information about the state of that car section. It further orders the car structures in a two-level ordering. During at least some of the collection pauses, one or more of the cars lowest in the overall order are collected; these form the collection-set. Using this ordering and careful placement policies, the algorithm allows the size of collection-sets to be bounded to achieve acceptable pause times even as it guarantees that unreachable data structures too large to fit into a collection-set will be isolated in single trains, and once there, reclaimed as a group.

During the operation of the algorithm, objects in a car may be evacuated, or relocated, to other cars. Incremental collectors, such as the Train algorithm, are attractive because they do not introduce significant delays in the collection process. In addition, they are suitable for concurrent garbage collection systems in which collection is performed in parallel by several concurrent threads or by different processors in a multiprocessor system. However, since the Train algorithm relocates most objects by copying them to new locations during a collection, traditionally all application threads are suspended during the collection process.

In order to allow the collection process to take place while non-collection threads are running, it is important to ensure that the algorithm does not mutilate the objects during the collection process in a manner visible to the non-collection threads. For example, if forwarding pointers are installed for relocated objects, these installed pointers cannot obliterate data that the non-collection threads will need.

Conventional solutions to prevent object mutilation have employed read barriers, which intercept an attempted read to data in the collected space and cause the read to be made through a forwarding pointer to obtain the relocated data. Alternatively, other solutions use non-destructive copying to relocate objects. Since the original object remains intact until the copying is complete, the relocation does not mutilate the object. When the copying is complete, the collector replaces the appropriate non-collection thread register contents and stack locations with pointers to the relocated copies. For example, non-destructive copying can be used with the Train algorithm to evacuate an object from a car by copying the object to another car and then updating references to the object to reflect its new location at the time memory associated with the car is reclaimed. In order to insure that the copying is non-destructive, these solutions must store the forwarding address and typically allocate space for this purpose in object headers.

Unfortunately, these conventional solutions consume additional space per object. For example, if the average object is 8-10 words in size, adding a word to the header of each object increases the average object size by 10-12.5%.

SUMMARY

In accordance with the principles of the present invention, a forwarding data structure is associated with each region in a chosen collection-set of a space-incremental collection technique. For example, in the context of the Train algorithm, a forwarding structure is associated with each car in the collection-set that manages more than one object. The forwarding data structure is used to map object locations in that car to their relocated destinations and, thus, avoids the need to store the forwarding address in each object header. The garbage collector that is relocating objects from the collection set makes use of the forwarding data structure to update references to already-located objects. Some implementations may allow non-collector threads to access objects in their relocated locations. When such an attempt is made to access an object, some mechanism, for example a read barrier, causes the forwarding data structure to be accessed and, if the object is found in the data structure, the corresponding forwarding address is used to access the object.

In one embodiment, the forwarding data structure is implemented as a hash table. This embodiment is most space efficient when the expected survival rate of objects in the car is less than thirty percent because the low survival rate compensates for the fact that each entry in the hash table must store two addresses, one address for the current location of the object and one address for the relocated location.

In another embodiment where objects have a minimum size and alignment, the forwarding data structure is implemented as a direct-mapped table with one entry for each minimum unit of memory in the associated region such as the car section of a car. For example, in the case where the minimum object size is two words and the minimum alignment of objects is two words, there is an entry in the direct-mapped table for every two words of memory.

In still another embodiment, the forwarding data structure is implemented as a direct mapped table with one entry per N words of memory allocated to the associated region, such as a car section for a car, and where N is possibly greater than the minimum size of an object. For example, with N taken as four and assuming two-word alignment of each object, each entry in the forwarding data structure is unique for any object whose size is greater than two words. In cases where more than one object starts in the same N-word sequence of memory corresponding to an entry, all of these objects are evacuated together at a small space cost.

In yet another embodiment, the forwarding data structure is implemented as a multi-level direct mapped table with one entry for N words. For example, in the case of a car, sixteen words of memory may be allocated to the car. Displacement sub tables handle collisions that may occur in the main table entries. Each top level entry is indexed by dividing the object's offset by the size of the N-word chunks and consists of two components: the object's old address and its relocated address (much like the case of the hash table discussed above). One of the two components forming the top-level entry is also encoded, for example, by using the low-order bit, to indicate whether the entry encodes relocation information for a single object or whether the entry points to a displacement table.

DETAILED DESCRIPTION

Figure 1:
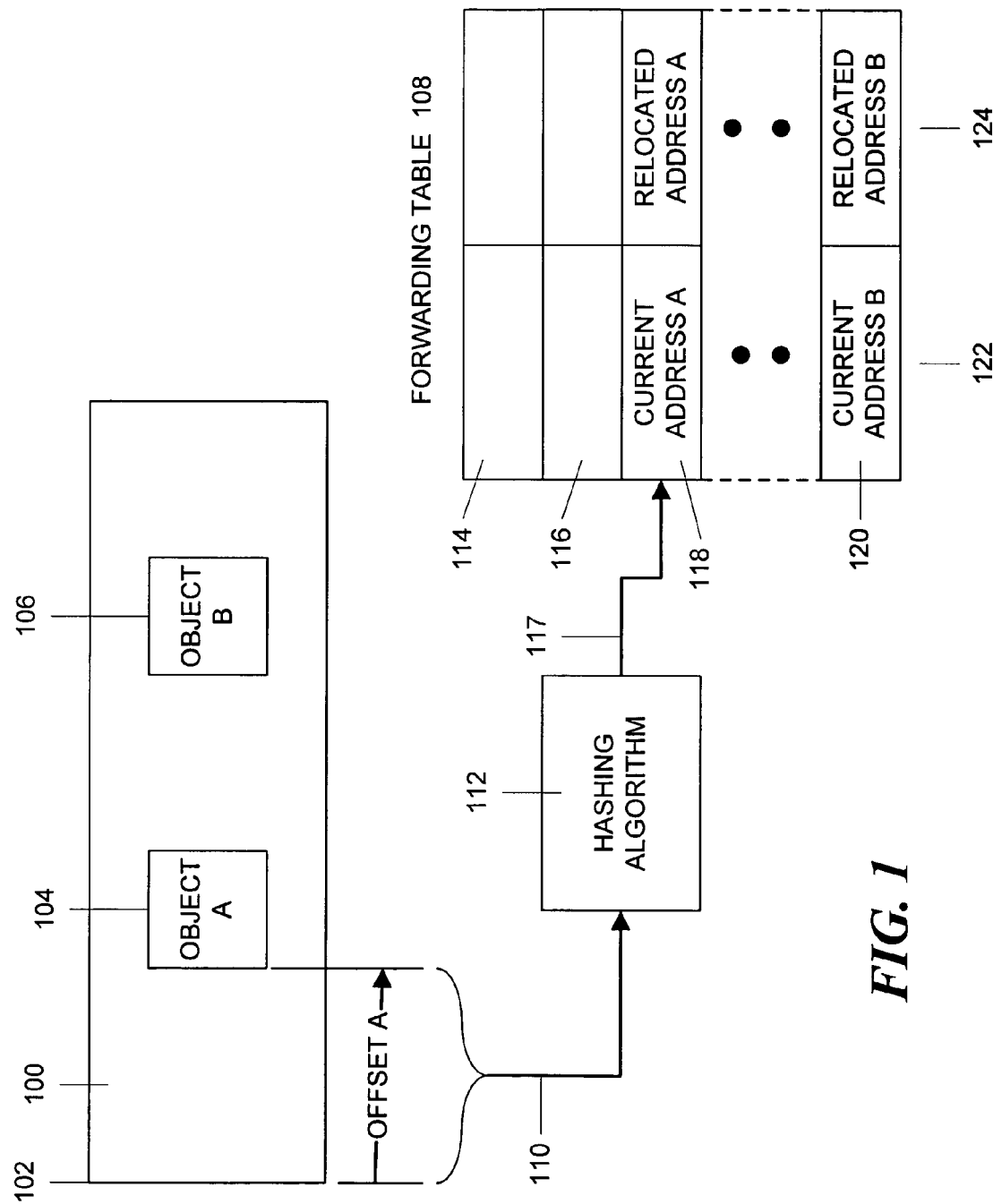
FIG. 1 illustrates a forwarding data structure associated with a car in accordance with the principles of the invention wherein the data structure is structured as a hash table.

For the purpose of this specification, the term "object" refers to a data structure that is represented in the memory of a computing system. This usage of the term "object" herein is distinct from the usage of the term "object" in "object-oriented" systems, wherein objects have associated "methods", i.e. pieces of code associated with them, which code may be invoked through a reference to the object. However, the present invention is applicable to such object-oriented systems. The present invention is also applicable to any implementation of a space-incremental collection technique that works by choosing some subset of memory, forming this subset into a collection-set, evacuating from that collection-set those objects reachable from references outside the collection-set, and reclaiming the remainder of the collection-set. In the description below a collection technique based on the Train algorithm is used for illustration purposes. However, those skilled in the art would understand that the same principles described below could be applied to other similar collection techniques without departing from the spirit and scope of the invention.

In accordance with the principles of the invention, a forwarding structure is associated with selected cars. This association can be made in a number of conventional ways. For example, memory space may be allocated for the forwarding structure at the time memory space is allocated for the car. The memory space for the forwarding structure may be contiguous to the car section or related in a fixed manner to the car section. Alternatively, a pointer may be inserted into the car which references the forwarding structure. Per-car forwarding structures are only required for "normal" cars, which are cars containing one or more objects that are neither popular nor oversized. Per-car forwarding structures are not required for "special" cars that contain only one object in each car. For special cars that are re-linked out of the collection-set no relocation information is required. For special cars containing once-popular objects, a single word in the car suffices to represent the requisite relocation information.

One limitation that arises using the aforementioned forwarding structures is that the technique bounds the maximum size of any given collection-set. However, this maximum limit can be controlled by (1) attempting to dynamically extend the available memory for the forwarding structures, (2) triggering collections before this maximum limit is reached, or (3) staging the collection of the collection-set in consecutive collections of portions of the collection-set. For example, one approach is to trigger collections before the maximum limit is reached and to allocate space for the forwarding structures from a demand-paged memory mapped region large enough to collect at least one eighth of the heap at any one time. With this approach, in all of the embodiments discussed below, the space cost of the forwarding structures is at most one sixteenth the size of the heap or less than 2.5 bytes per object on average. As a fallback if, for some reason, the forwarding structures are too small, the collector may transition to a mode in which all non-collection threads are stopped during the remainder of the collection.

FIG. 1 is a block schematic diagram showing one embodiment of the invention in which the per-car forwarding data structure is a hash table. In the Train algorithm, within each car, each object is located at a fixed offset from the address of the start of the car section. In particular, FIG. 1 illustrates a car 100 that contains two objects, object A (104) and object B (106). These objects are located at fixed offsets, offset A and offset B, respectively, from the starting address 102 of car 100. Car 100 has a forwarding hash table 108 associated with it. Accordingly, table 108 would typically have a number of entries that are represented by rows in the table 108. In FIG. 1 table entries 114-120 are illustrated. The number of entries in the table 108 is determined by the hashing algorithm used by the program that writes information into, and reads information from, the table. Typically, in order to conserve space, the number of entries is substantially lower than the total number of objects that could possibly be inserted into the car 100.

Each table entry stores two addresses represented by columns 122 and 124 in FIG. 1. The first address is the current address of an object and the second address is the address of the relocated copy of the object. When an object, such as object A 104 is evacuated by copying the object into another car, one table entry is written containing the address of object A in car 100 and the address of the copy of object A in the other car. The table entry into which the addresses are written is determined by calculating an index into the table. In turn, the index is calculated by providing the offset of the object in the car to a hashing algorithm to generate the table entry number as an index. For example, offset A is provided to hashing algorithm 112 as indicated schematically by arrow 110 to generate the table entry number index indicated schematically by arrow 117. A different offset, such as the offset of object B 106 might generate a different table entry number index such as entry number 120.

Because there are fewer table entries than the possible number of objects, two different object offsets can generate the same table entry number as an index. Thus, an attempt to store a pair of addresses during an object evacuation may determine that addresses have already been stored in the calculated entry from a previous object evacuation producing what is called a "collision." If a collision occurs, additional processing must be performed to store the colliding table entry in another location in order to prevent overwriting the existing entry. This further processing is called "resolving" the collision.

The probability that a collision occurs is determined by the hashing algorithm 112. Many hashing algorithms and their properties are well-known. For example, a well-known hashing algorithm that is suitable for use with the present embodiment is called an open addressed hashing algorithm. Many examples of this algorithm and other algorithm suitable for use with the invention can be found in the third volume of a reference entitled the "Art of Computer Programming", D. E. Knuth, Addison-Wesley, 1997. In the present context, a good hashing algorithm accepts various object offsets and attempts to distribute the resulting table entries in a uniform manner over the table so as to minimize the need to resolve collisions.

Similarly, mechanisms for resolving collisions are also well-known. For example, one or more linked lists may be used to store the colliding table entries. It is also possible to store colliding entries in sub tables instead of linked lists. If tables are used, a variety of known probing methods can be used to locate the required entry within the table. For example, the table can be searched sequentially until the desired entry is found. Alternatively, a secondary hashing scheme can be used.

As previously mentioned, a hash table implementation is most efficient in systems when the expected survival rate of objects in the car is less than thirty percent. In this situation, even though each table entry must store two addresses, the low survival rate ensures that each car will be sparsely populated because many objects will not survive to the next collection cycle. Thus, the hash table can be much smaller than the number of possible objects in the car without causing a large number of collisions.

An additional consideration when choosing this embodiment is dependent on the type of memory system used. For example, an entry in the forwarding table is typically written by atomically claiming (via a compare-and-swap operation) the first 64 bits in the entry. In a 32-bit virtual memory, this is sufficient to write the entire table entry including the original object address and the address of the object copy. However, in a 64-bit virtual memory, this is only sufficient to write the original object address. In this case, a race may develop between the collection thread that is trying to write the forwarding address and a non-collection thread that is trying to read the forwarding address, thereby causing one, or both, threads to enter spin-wait cycles, which reduces the efficiency of the operation.

Figure 2:
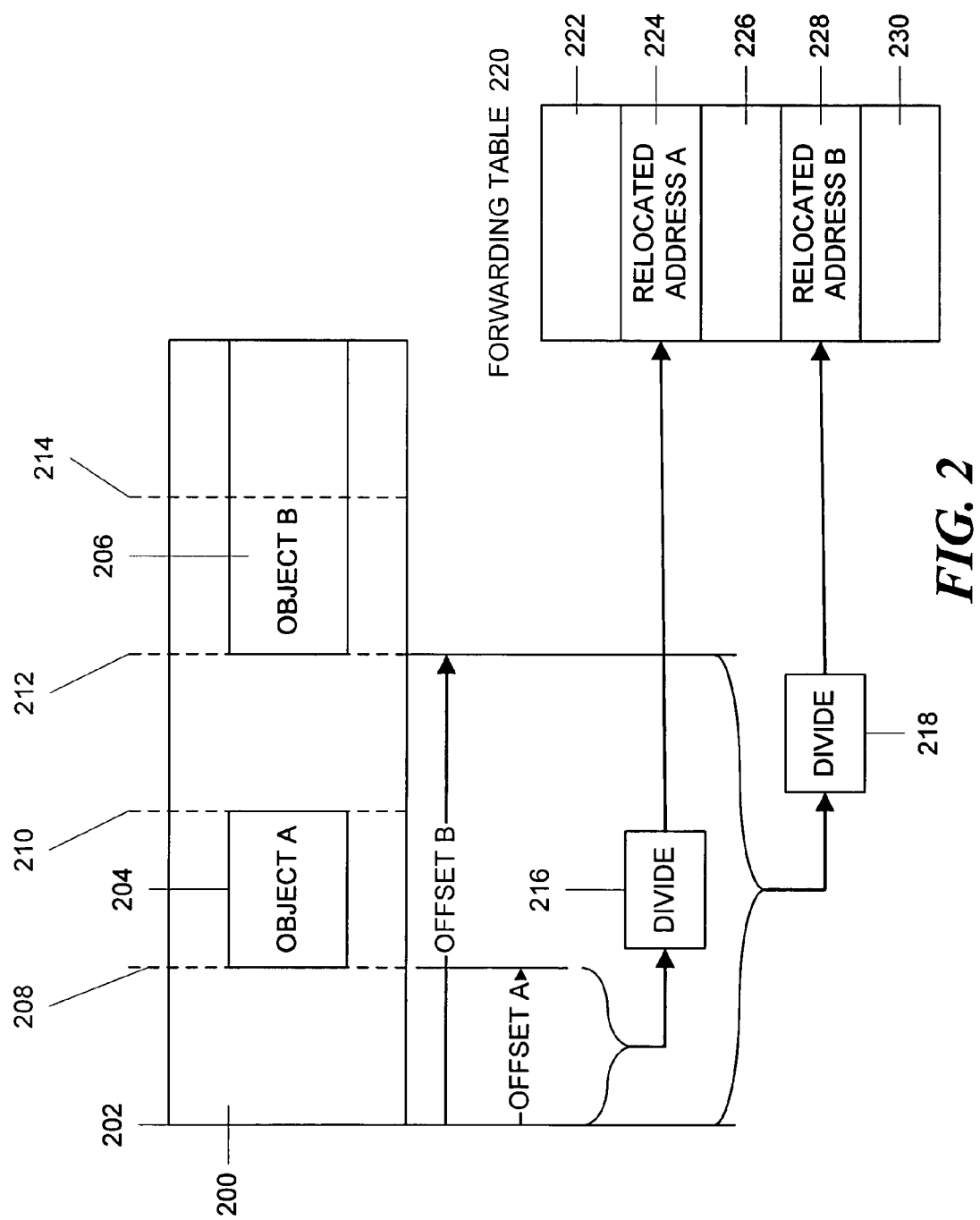
FIG. 2 illustrates a forwarding data structure associated with a car in accordance with the principles of the invention wherein the data structure is structured as a direct mapped table.

In another embodiment, a direct mapped table can be used as the per-car forwarding data structure. In the simplest arrangement, the direct mapped table has an entry for each possible object in the car and, accordingly, no collisions can occur. Such an arrangement is schematically illustrated in FIG. 2. For illustration purposes in FIG. 2, objects have been assumed to have a minimum size of two words and are located on double word boundaries in the car. For clarity, car 200 is shown as accommodating, at most, five objects, but typically a car would accommodate many more objects. Each object is located on one of double word boundaries 202, 208, 210, is 212 and 214. Two such objects, object A 204 and object B 206 are shown. It is also possible for objects to have single word minimum lengths and be located on word boundaries. Other object lengths are also possible.

In the arrangement illustrated in FIG. 2, the forwarding table 220 would have five entries 222-230 to accommodate each of the five possible objects. An index into the table is calculated by dividing the offset (expressed in bytes) of the object by the size in bytes of the minimum object length (two words). This division is commonly performed by shifting the offset by the log of the minimum object length size when this size is a power of two. For example, for object A 204 the table index would be determined by dividing the offset A (from the starting address 202 of the car 200) by the number of bytes in two words as indicated schematically by divider 216. The result (one) is then applied to select the second entry 224 in forwarding table 220. In this entry 224, the address of the relocated copy of object A is stored.

Similarly, for object B 206 the table index would be determined by dividing the offset B by the number of bytes in two words as indicated schematically by divider 218. The result (three) is then applied to select the fourth entry 228 in forwarding table 220. In this entry 228, the address of the relocated copy of object B is stored.

Figure 3:
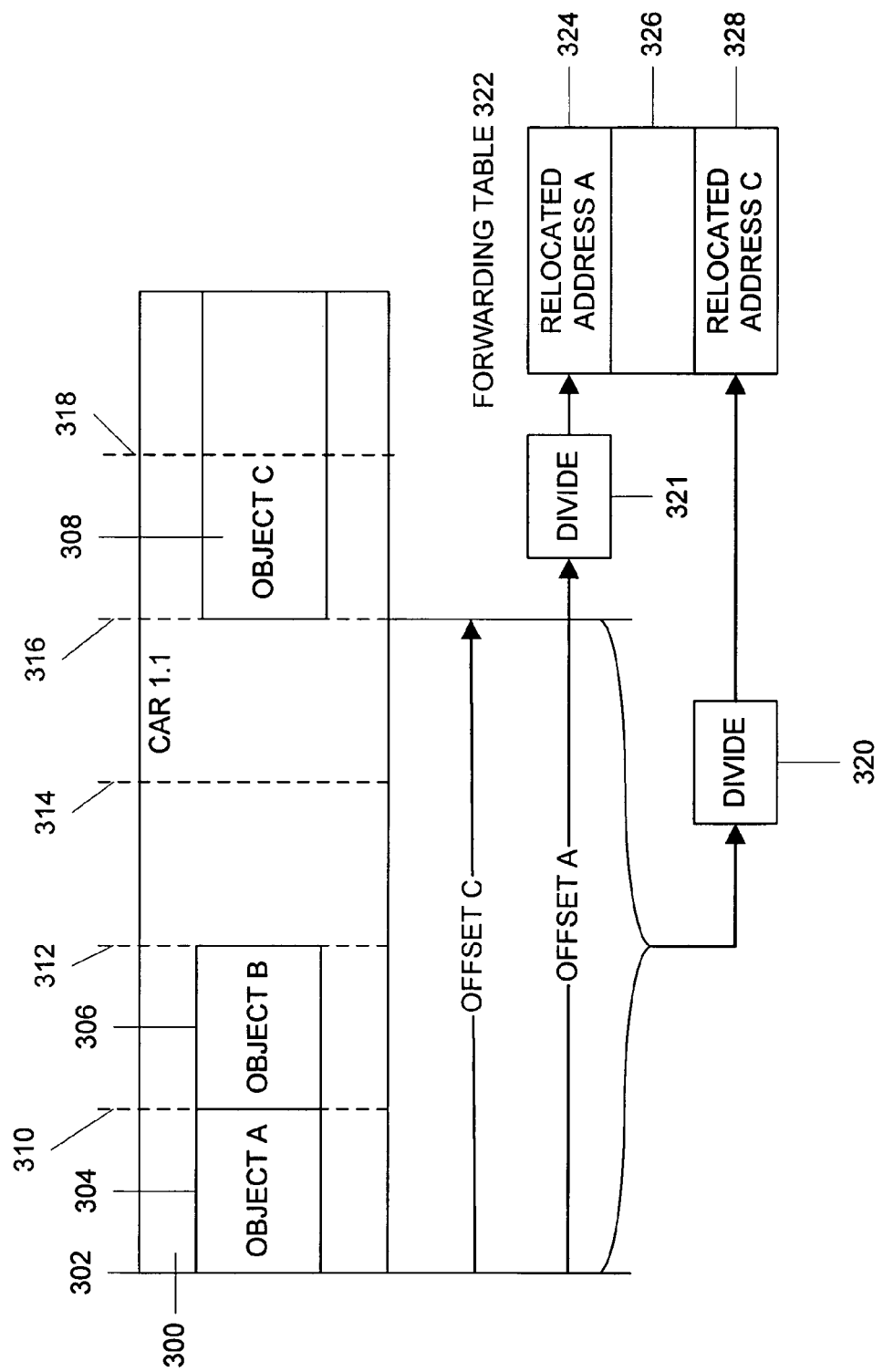
FIG. 3 illustrates a forwarding data structure associated with a car in accordance with the principles of the invention wherein the data structure is structured as another direct mapped table.

With an arrangement such as that shown in FIG. 2, it is also possible to reduce the size of the forwarding table by creating a forwarding table with less table entries than the total number of possible objects in the car. For example, another embodiment is illustrated in FIG. 3 in which the per-car forwarding data structure is also a direct mapped table. In this embodiment, car 300 can contain six possible two-word objects. Each two word object is located on a double word boundary, such as boundaries 302, 310, 312, 314, 316, and 318. However, forwarding table 322 contains one entry per four words allocated to car 300 and thus contains three entries 324-328. In this embodiment, one table entry is assigned to each four word contiguous sequence. The index assigned to a four word sequence is determined by dividing the offset (in bytes) of that sequence by the number of bytes in four words and using the quotient as the index. For example, a table index is calculated for the two objects, object A and object B in the first four word sequence by dividing the offset of the four word sequence (zero) by the number of bytes in the four words, as indicated at 321, to arrive at a forwarding table index of zero. Thus, the address of the relocated copy is stored in the first entry 324 of the forwarding table 322. Similarly, for object C 308, a table index is calculated for third four word sequence by dividing the offset of the four word sequence (eight) by the number of bytes in the four words, as indicated at 320, to arrive at a forwarding table index of two. Thus, the address of the relocated copy is stored in the third entry 328 of the forwarding table 322.

In this embodiment, the Train algorithm is modified to copy, or evacuate, all objects starting in each four-word sequence during a single evacuation operation. For example, suppose that a reference is followed to object A which has not yet been evacuated, and so, a decision is made to evacuate that object. If object A and another object B both start in the same four-word sequence, both objects will be evacuated. Thus, in this case, both object A 304 and object B 306 would be evacuated together. However, there is a possibility that object B itself is unreachable and thus is actually garbage. Nevertheless, it will be evacuated and treated as if it were still in use.

It is also possible to reduce the size of the forwarding address table by further reducing the number of table entries, in turn, by assigning more space allocated in the region to each entry. For example, each table entry may be associated with N words of space allocated to the region. In this case, multi-level tables are used as the forwarding data structure. Two levels may be used, but the multi-level table may contain additional levels. When such multi-level tables are used, generally N is selected so that most N-word blocks will contain at most one object and the corresponding table entry would contain both the current object address and the relocated object address.

However, there may be some N-word blocks that contain more than one object. To distinguish these objects, entries in each table level, except the lowest or leaf table level, must also contain information that encode one of the following three cases: (a) the entry is empty (for example, one or both of the current and relocated addresses are NULL), (b) the entry contains the current and relocated addresses for a single object in the N-word block of memory associated with that entry, and (c) the entry contains a reference to a displacement sub table used to disambiguate the address information for several objects where these objects all start in the same N-word block associated with the entry.

Cases (b) and (c) can be distinguished by tagging one of the two addresses in the entry. This could be done by toggling a low-order bit in one of the two addresses forming the entry or by using a distinguished, known-not-to-be-a-valid-address for the relocated address in case (c). Such a value might be the constant "1" or the constant "−1". Any other value can be used as long as it is not in use for a possible valid object address.

Figure 4:
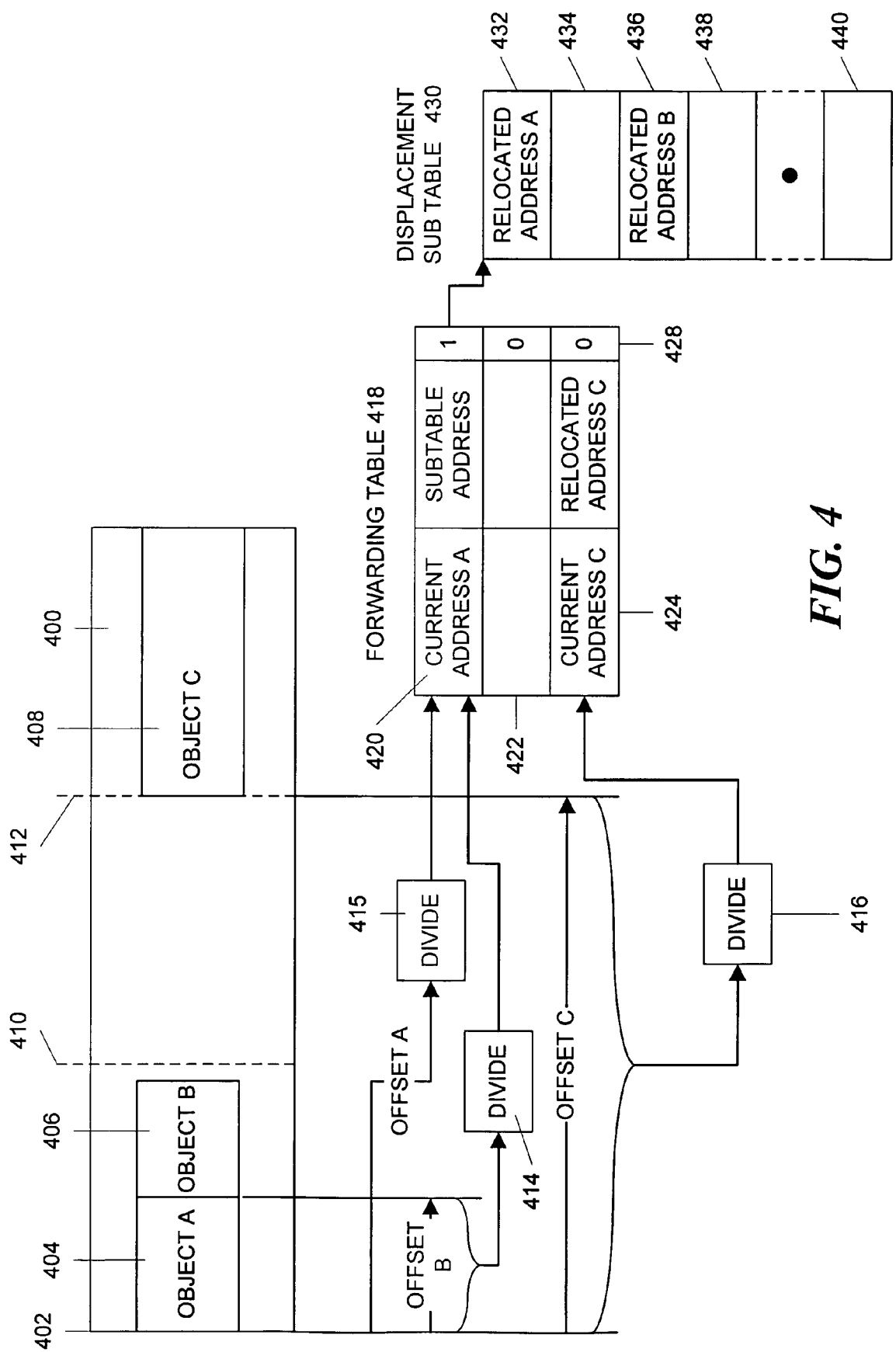
FIG. 4 illustrates a forwarding data structure associated with a car in accordance with the principles of the invention wherein the data structure is structured as a direct mapped table with displacement sub tables to handle possible collisions.

For example, consider an embodiment where sixteen words of space allocated to a region are associated with each table entry and the table has two levels. FIG. 4 illustrates such embodiment for use with the aforementioned Train algorithm in which each forwarding address table entry is associated with sixteen words of allocated space in a car region. Collisions in writing a table entry are handled by creating a displacement sub table for the entry when a collision occurs. Assuming that each object has a minimum two word size, FIG. 4 shows a car 400 has 48 words of space allocated to it. This space can be divided into three equal-sized blocks of sixteen words indicated by block boundaries 402, 410 and 412. FIG. 4 also illustrates three objects 404, 406 and 408 in the car 400. Objects 404 and 406 are in the first sixteen-word block.

When object A 404 is evacuated, an index into the forwarding address table 418 is calculated for writing the forwarding address by dividing the offset (offset A, in this case, zero) of the object 404 from the start of the car 400 by the number of bytes in the sixteen-word block and using the integer part of the quotient (ignoring any remainder as indicated at 415) to arrive at a forwarding table index of zero. Thus, the address of the relocated copy will be written into table entry 420 of forwarding table 418. Each entry in the forwarding table 418 contains two addresses: the current address of the object and the relocated address of the object copy.

When object B 406 is evacuated, an index into the forwarding address table 418 is calculated by dividing the offset (offset B, for example, six bytes) of the object 406 from the start of the car 400 by the number of bytes in the sixteen-word block and using the integer part of the quotient as the index, as indicated at 414, to arrive at a forwarding table index of zero. However, table entry 420 is already occupied by the current address of object 404 and the forwarding address of the relocated copy of object 404, and a collision occurs.

When such a collision occurs, a displacement sub table 430 is created for the forwarding table entry 420. Displacement sub table 430 has an entry for each possible object in the sixteen-word block. In this case, since each object has a minimum size of two words, sub table 430 would have eight entries, of which entries 432-440 are shown. Then, the remainder of the quotient resulting from the division 414 divided by the word length is used as an index into the displacement sub table 430. In this case, the remainder of six bytes divided by the word length of two results in the third entry 436 being selected. Thus, the address of the relocated copy of object B 406 will be written into table entry 436 of displacement sub table 430 using, for example, a simple compare and swap operation.

The forwarding address of object A is also moved from the forwarding table 418 to its proper location in the displacement sub table 430 as indicated by entry 432. In the forwarding table 418, this latter address (or the current address of object A) is then replaced by the address of the displacement sub table 430. When object C 408 is evacuated, an entry in the forwarding address table 418 is selected for writing by dividing the offset (offset C, in this case, 32 bytes) of the object 408 from the start of the car 402 by the number of bytes in the sixteen words and ignoring any remainder, as indicated at 416, to arrive at a forwarding table index of two. Thus, the address of the relocated copy will be written into table entry 424 of forwarding table 418. Since object C occupies the entire sixteen word sequence no collisions can occur.

Some mechanism must be used to indicate whether the address in the forwarding table 418 is to be used as the forwarding address or whether the actual forwarding address is stored in a displacement sub table. In this embodiment, the least significant bit of the relocated address is used. For example, this bit 428 could be set to "0" to indicate that the relocated address is stored in the forwarding table 418. Bit 428 could be set to "1" to indicate that the relocated address is stored in the displacement sub table 430 and that the address stored in the forwarding table 418 is the address of the sub table 430. Of course other bit patterns or mechanisms could also be used to indicate whether the address is stored in the forwarding address table or the displacement sub table. For example, in other embodiments, the distinguished, known-not-to-be-a-valid-address could be used for either the relocated address or the current address as discussed above.

Figure 5:
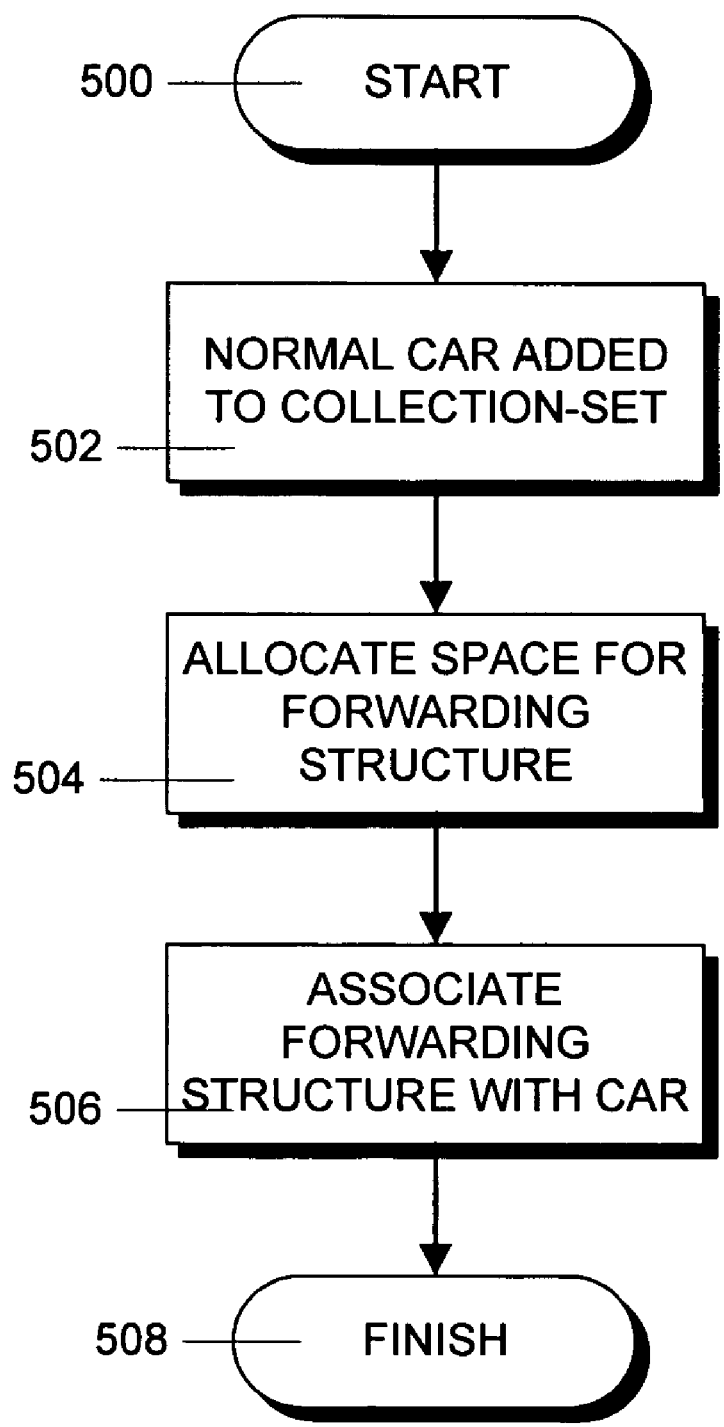
FIG. 5 is a flowchart showing the steps in an illustrative process for creating a forwarding data structure.
Figure 6:
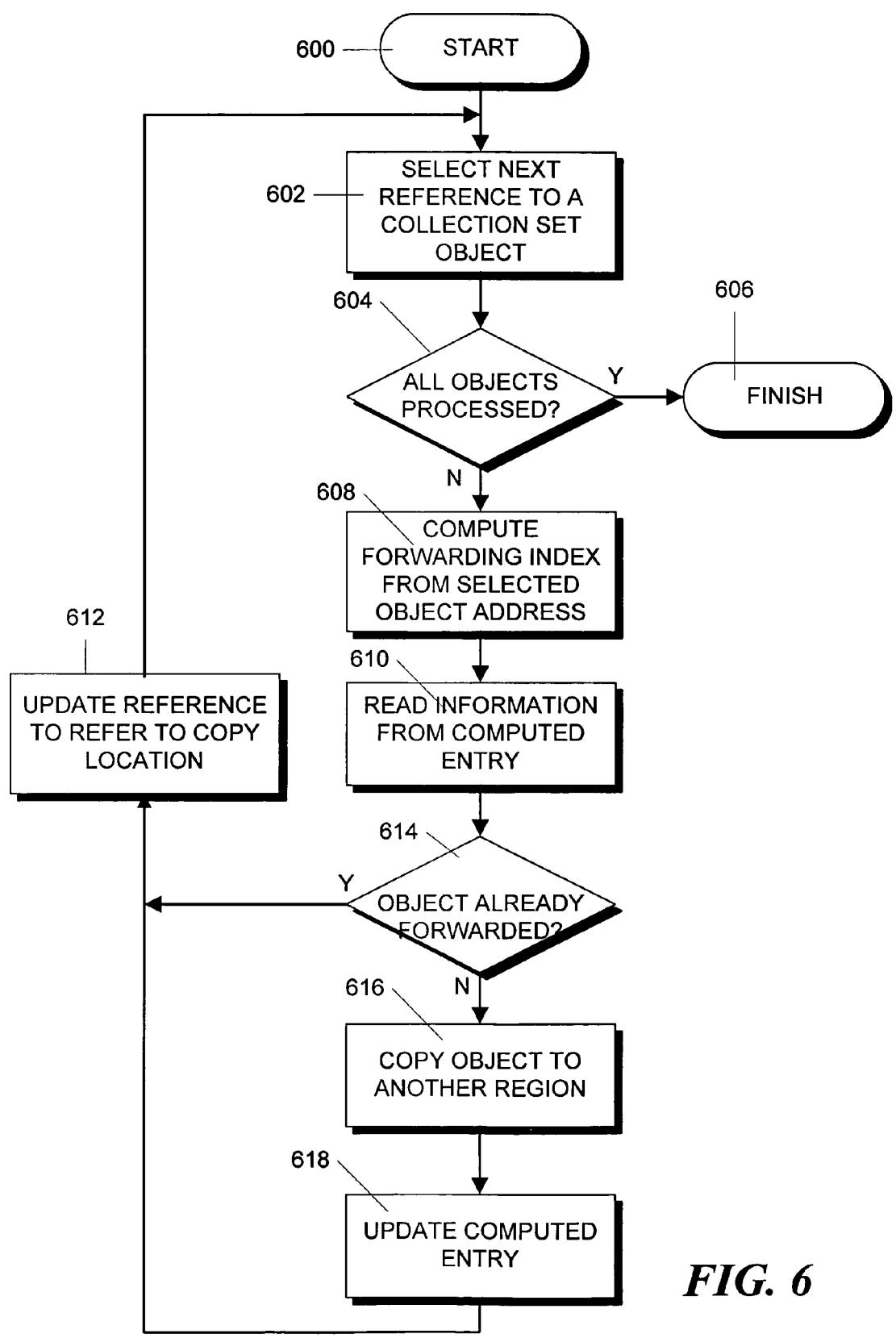
FIG. 6 is a flowchart showing the steps in an illustrative process for writing the forwarding data structure during evacuation of objects from a car.

The operation of the inventive system is illustrated in the flowcharts of FIGS. 5 and 6. Specifically, FIG. 5 illustrates the steps performed to create and initialize the forwarding structure in accordance with the principles of the invention. This process starts in step 500 and proceeds to step 502 where a normal car is added to the collection-set. Then, in step 504, space is allocated for the forwarding data structure. The amount of space allocated is dependent on the precise forwarding structure used as discussed above. Next, in step 506, the forwarding structure is associated with the car section as set forth above. The process then finishes in step 508.

FIG. 6 illustrates the writing the forwarding structure entries in the context of processing references to collection set objects. This process starts in step 600 and proceeds to step 602 where the next reference to a collection set object is selected. Then, in step 604, a determination is made whether all objects have been processed. If all objects have been processed, the process finishes in step 606.

Alternatively, if objects remain to be processed as determined in step 604, then, in step 608, an index into the forwarding structure is computed from the selected object address as discussed above. In step 610, the forwarding structure is read using the index to obtain the information in the computed entry. This information is then checked to determine whether the object has already been forwarded by copying it to a new region. If so, the reference is updated to refer to the relocated address of the copy in step 612. The process then returns to step 602 to determine whether further references remain to be processed.

Alternatively, if, in step 614, it is determined that the object has not been forwarded, then, in step 616, the object is copied to another region in accordance with the particular collection algorithm that is being used to perform the collection. In step 618, the forwarding structure entry is updated with the object current address and relocated address in accordance with the particular forwarding structure used as discussed above. Next, in step 612, If so, the reference is updated to refer to the relocated address of the copy in step 612. Finally, the process then returns to step 602 to determine whether further references remain to be processed.

The forwarding data structure can also be used to forward a reference to an object to its relocated copy. In particular, when a thread other than the thread doing the collecting, attempts to access an object that has been relocated, some mechanism, for example, a read barrier, intercepts the access. The forwarding structure index is recomputed using the object address and the computation method originally used to write the table as discussed above. Then the recomputed index is used to read the forwarding structure and obtain the relocated address. Alternatively, if the forwarding data structure is a table with entries that contain both the current address of the object and the address of the relocated copy, such as the hash table example described above, then the table can be directly indexed on the object current addresses and the address of the relocated copy can be obtained by using the current object address as the table index. Finally, the address of the relocated copy is used to access that copy instead of the original object. Consequently, all changes will be made to the relocated copy rather than the original object. Once a region has been completely evacuated, the space in the region is reclaimed and the space occupied by the associated forwarding data structure is also reclaimed.

It is possible to improve the efficiency of the forwarding structures if additional information is available. For example, if a given object is only reachable by a single reference, then no forwarding address is necessary and, consequently, no forwarding structure is needed for that object. While the conventional Train algorithm counts references outside the collection-set to detect potentially popular objects, it does not, in general, count all references and, therefore, objects with a single reference are not detectable. However, if the algorithm is modified to count all references or if singly-referenced objects can be discovered through other means, such as static analysis, the efficiency of the forwarding structures can be significantly improved. Alternatively, if objects are segregated in such a manner that it can be determined that there are no references from other cars in the collection-set into a car being processed and it can be determined there are no extra-generational references into that car, the reference counts generated by the algorithm will be accurate. Consequently, objects with a count of one reference will need no forwarding information.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different forwarding structures other than those specifically described could be used.

The order of the process steps may also be changed without affecting the operation of the invention. Other aspects, such as the specific process flow, as well as other modifications to the inventive concept are intended to be covered by the appended claims.

What is claimed is:

1. A method for forwarding references to objects concurrently with garbage collection using a space-incremental algorithm in which objects are located in a first memory region having a starting address, the method comprising:
   creating and associating a forwarding data structure with the first memory region;
   when an object is evacuated from the first memory region in accordance with the algorithm, copying the object to a second memory region;
   calculating an index into the forwarding data structure based on a location of the object in the first memory region;
   using the calculated index to write an address of the object copy in the second memory region into the forwarding data structure; and
   when the object is referenced in the first memory region, using the forwarding data structure to locate the object copy address and causing the object copy to be accessed.

2. The method of claim 1 wherein using the forwarding data structure further comprises recalculating the index based on the location of the object in the first memory region and causing the object copy to be accessed further comprises using the recalculated index to access the forwarding data structure in order to locate the object copy address.

3. The method of claim 1 wherein the forwarding data structure has entries that contain both an object address and an object copy address and wherein using the forwarding data structure further comprises using the object address to directly index the forwarding data structure to locate the object copy address.

4. The method of claim 1 wherein the forwarding data structure comprises a hash table and calculating an index further comprises applying a hash function to an offset of the object location from the starting address in order to generate the index.

5. The method of claim 1 wherein the forwarding data structure comprises a direct mapped table having an entry for each object that could possibly be located in the first memory region and wherein calculating an index further comprises using an offset of the object location from the starting address as the index.

6. The method of claim 1 wherein the first memory region is divided into equal sized blocks, each of which can hold a plurality of objects and the forwarding data structure is a direct mapped table having an entry for each block and wherein calculating an index further comprises dividing an offset of a starting address of the object from the starting address by the number of bytes in a block and using the integer part of a resulting quotient as the index.

7. The method of claim 6 further comprising the step of relocating all objects in a block when one object in the block is relocated.

8. The method of claim 6 further comprising:
   creating a displacement sub table having a plurality of entries when two objects in a block generate the same index;
   calculating an index into the displacement sub table for each of the two objects; and
   using the computed indices to write an address in the second memory region of a copy of each of the two objects into the displacement sub table.

9. The method of claim 8 wherein creating a displacement sub table further comprises creating the displacement sub table with the plurality of entries equal to the number of objects that could possibly be located in a block.

10. The method of claim 8 wherein calculating an index into the displacement sub table further comprises dividing an offset of an object from the starting address by the number of bytes in a block and using the remainder of the resulting quotient as the index into the sub table.

11. The method of claim 8 further comprising:
   marking each entry in the plurality of entries to indicate when a displacement sub table exists for that entry.

12. The method of claim 1 wherein the space-incremental algorithm is the Train algorithm and the first memory region is a car section managed by a car.

13. Apparatus for forwarding references to objects concurrently with garbage collection using a space-incremental algorithm in which objects are located in a first memory region having a starting address, the apparatus comprising:
   a mechanism that creates and associates a forwarding data structure with the first memory region;
   a mechanism operable when an object is evacuated from the first memory region in accordance with the algorithm, that copies the object to a second memory region;
   a mechanism that calculates an index into the forwarding data structure based on a location of the object in the first memory region;
   a mechanism that uses the calculated index to write an address of the object copy in the second memory region into the forwarding data structure; and
   a mechanism operable when the object is referenced in the first memory region, that uses the forwarding data structure to locate the object copy address and causing the object copy to be accessed.

14. The apparatus of claim 13 wherein the mechanism that uses the forwarding data structure to locate the object copy comprises a mechanism that recalculates the index based on the location of the object in the first memory region and uses the recalculated index to access the forwarding data structure in order to locate the object copy address.

15. The apparatus of claim 13 wherein the forwarding data structure has entries that contain both an object address and an object copy address and wherein the mechanism that uses the forwarding data structure to locate the object copy comprises a mechanism that uses the object address to directly index the forwarding data structure to locate the object copy address.

16. The apparatus of claim 13 wherein the forwarding data structure comprises a hash table and the mechanism that calculates an index into the forwarding data structure comprises a mechanism that applies a hash function to an offset of the object location from the starting address in order to generate the index.

17. The apparatus of claim 13 wherein the forwarding data structure comprises a direct mapped table having an entry for each object that could possibly be located in the first memory region and wherein the mechanism that calculates an index into the forwarding data structure comprises a mechanism that uses an offset of the object location from the starting address as an index.

18. The apparatus of claim 13 wherein the first memory region is divided into equal sized blocks, each of which can hold a plurality of objects and the forwarding data structure is a direct mapped table having an entry for each block and wherein the mechanism that calculates an index into the forwarding data structure comprises a mechanism that divides an offset of a starting address of the object from the starting address by the number of bytes in a block and uses the integer part of a resulting quotient as the index.

19. The apparatus of claim 18 further comprising a mechanism that relocates all objects in a block when one object in the block is relocated.

20. The apparatus of claim 18 further comprising:
a mechanism that creates a displacement sub table having a plurality of entries when the mechanism that calculates an index into the forwarding data structure generates the same index for two objects in a block;
a mechanism that calculates an index into the displacement sub table for each of the two objects; and
a mechanism that uses the computed indices to write an address in the second memory region of a copy of each of the two objects into the displacement sub table.

21. The apparatus of claim 20 wherein the mechanism that creates a displacement sub table comprises a mechanism that creates the displacement sub table with the plurality of entries equal to the number of objects that could possibly be located in a block.

22. The apparatus of claim 20 wherein the mechanism that calculates an index into the displacement sub table comprises a mechanism that divides an offset of an object from the starting address by the number of bytes in a block and uses the remainder of the resulting quotient as the index into the sub table.

23. The apparatus of claim 20 further comprising:
a mechanism that marks each entry in the plurality of entries to indicate when a displacement sub table exists for that entry.

24. The apparatus of claim 13 wherein the space-incremental algorithm is the Train algorithm and the first memory region is a car section managed by a car.

25. Apparatus for forwarding references to objects concurrently with garbage collection using a space-incremental algorithm in which objects are located in a first memory region having a starting address, the apparatus comprising:
means for creating and associating a forwarding data structure with the first memory region;
means operable when an object is evacuated from the first memory region in accordance with the algorithm, for copying the object to a second memory region;
means for calculating an index into the forwarding data structure based on a location of the object in the first memory region;
means for using the calculated index to write an address of the object copy in the second memory region into the forwarding data structure; and
means operable when the object is referenced in the first memory region, for using the forwarding data structure to locate the object copy address and for causing the object copy to be accessed.

26. The apparatus of claim 25 wherein the means for using the forwarding data structure to locate the object copy comprises means for recalculating the index based on the location of the object in the first memory region and means for using the recalculated index to access the forwarding data structure in order to locate the object copy address.

27. The apparatus of claim 25 wherein the forwarding data structure has entries that contain both an object address and an object copy address and wherein the means for using the forwarding data structure to locate the object copy comprises means for using the object address to directly index the forwarding data structure to locate the object copy address.

28. A computer readable medium comprising computer program code stored therein for forwarding references to objects concurrently with garbage collection using a space-incremental algorithm in which objects are located in a first memory region having a starting address, the computer program code comprising:
program code for creating and associating a forwarding data structure with the first memory region;
program code operable when an object is evacuated from the first region in accordance with the algorithm, for copying the object to a second memory region;
program code for calculating an index into the forwarding data structure based on a location of the object in the first memory region;
program code for using the calculated index to write an address of the object copy in the second memory region into the forwarding data structure; and
program code operable when the object is referenced in the first memory region, for using the forwarding data structure to locate the object copy address and for causing the object copy to be accessed.

* * * * *